Sept. 16, 1952 C. SCHULTZ 2,610,814
POWER BOOST SURFACE CONTROLS
Filed July 31, 1948 4 Sheets-Sheet 1

INVENTOR.
Carl Schultz
BY M. B. Tasker
ATTORNEY

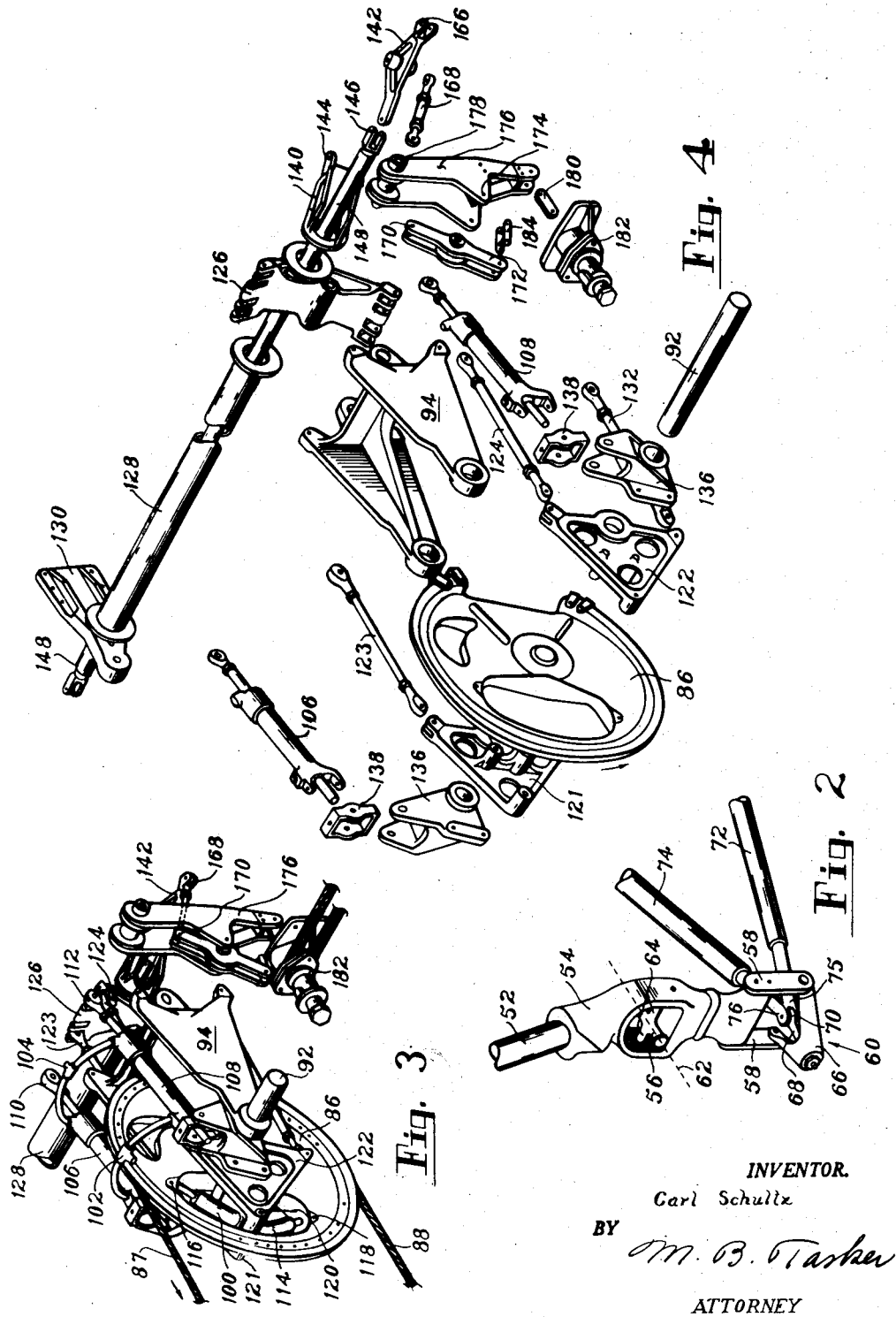

Sept. 16, 1952 C. SCHULTZ 2,610,814
POWER BOOST SURFACE CONTROLS
Filed July 31, 1948 4 Sheets-Sheet 3

INVENTOR.
Carl Schultz
BY
M. B. Tasker
ATTORNEY

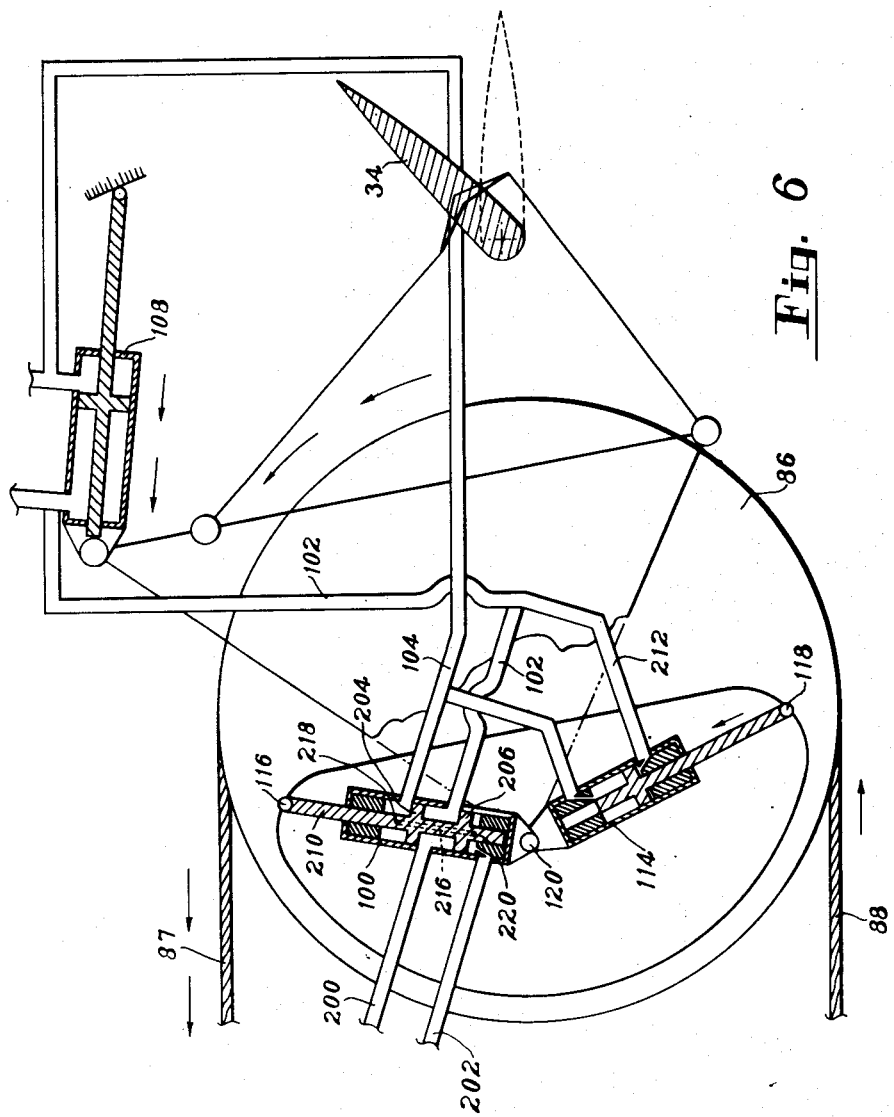

Patented Sept. 16, 1952

2,610,814

UNITED STATES PATENT OFFICE 2,610,814

POWER BOOST SURFACE CONTROL

Carl Schultz, Milford, Conn., assignor to United Aircraft Corporation, East Hartford, Conn., a corporation of Delaware Application July 31, 1948, Serial No. 41,812

2 Claims. (Cl. 244—85)

This invention relates to surface control systems for aircraft and particularly to surface control systems for low aspect ratio all-wing aircraft.

It is an object of this invention to provide an improved surface control system for aircraft including two all-moving or unit tail surfaces which replace the conventional elevators and ailerons and to provide an improved operating mechanism for moving these surfaces either differentially, identically, or in some compromise manner by a single pilot control member.

Another object of this invention is to provide a combined leading tab in such a unit tail surface in combination with a power boost mechanism.

A further object of this invention is to provide complete control of unit tail surfaces on a low aspect ratio all-wing airplane both as ailerons and elevators by a single control column.

A still further object of this invention is to provide complete control of unit tail surfaces on a low aspect ratio all-wing airplane both as elevators and ailerons by a single control column and a power boost mechanism; the boost mechanism having the properties of producing feel forces in the control column in proportion to the aerodynamic loads acting on the control surface.

Another object of this invention is to provide a power boost mechanism for operating a unit control surface which has a negative trailing tendency in certain ranges of deflection including a leading tab mechanism to automatically reduce such negative or overbalanced characteristics.

These and other objects and advantages of the invention will become evident from the following specific description of a preferred embodiment of the invention illustrated in the accompanying drawings wherein like reference numerals denote corresponding parts throughout the several views.

In these drawings,

Fig. 2 is an enlarged perspective detail of the support for the control column and the operating connections to the column;

Fig. 3 is an enlarged perspective view showing the power control mechanism and leading tab linkages for the unit control surfaces;

Fig. 4 is an exploded view of the movable elements of the control mechanism of Fig. 3;

Fig. 6 is similar to Fig. 5 but indicates the position of the power boost elements when the control surface is being deflected in one direction.

Reference is hereby made to Patent No. 2,585,411 dated February 12, 1952, owned by the assignee of the present application, which discloses common subject matter.

Figure 1:
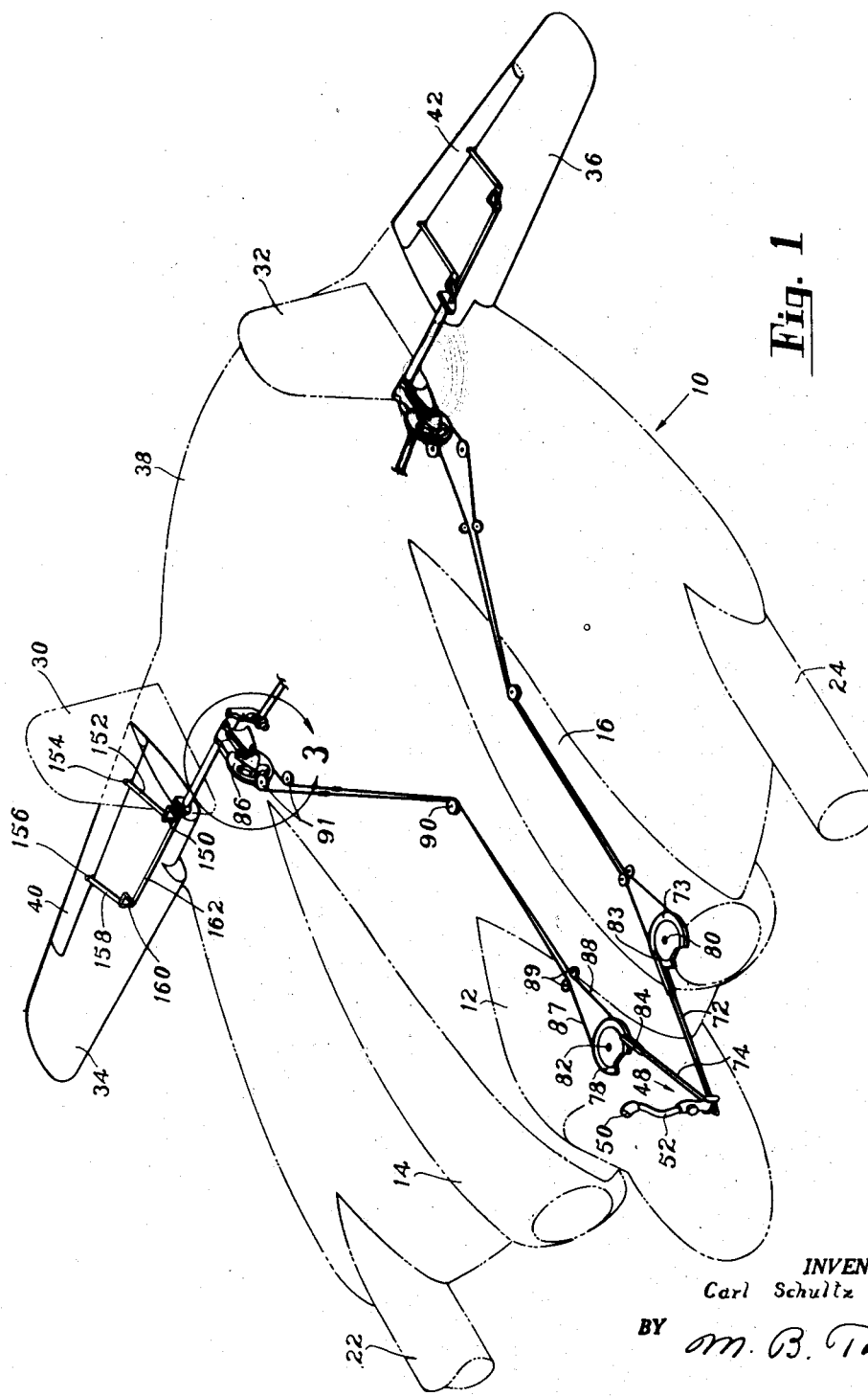
Fig. 1 is a perspective view of a low aspect ratio all-wing airplane having the control system of this invention, the airplane being shown in phantom.

Referring to Fig. 1, the numeral 10 indicates generally the main wing portion of the airplane which contains a pilot compartment 12, engine nacelles 14 and 16, and propeller mounting nacelles 22 and 24 which project forward of the leading edge of the wing near the lateral extremities thereof. The main wing 10 is provided with vertical stabilizing surfaces 30 and 32 and is also provided with outwardly projecting control surfaces 34 and 36 the trailing edges of which form extensions of the trailing edge 38 of the main wing 10. The control surfaces 34 and 36 are provided with trailing edge tabs 40 and 42, respectively, which extend from the wing 10 outboard a substantial distance along the length of the surfaces 34 and 36 and operate as leading or anti-boost tabs.

The pivoted control surfaces 34 and 36 and their pivoted trailing edge tabs 40 and 42 comprise all moving or unit control surfaces which are particularly advantageous in low aspect all-wing aircraft. Whereas the unit control surface when applied to the conventional airplane permits the use of a surface of less area than would be possible by the use of ordinary elevator-stabilizer combination, the use of such unit control surfaces in the all-wing low aspect ratio airplane shown herein is particularly advantageous because of extremely large range of angles of incidence of the air in the region of these control surfaces.

The airplane illustrated operates to an angle of attack range from zero to 35 degrees in power off flight and the range from zero to 90 degrees in power on flight. Incidence of the air in the region of the horizontal tail surfaces varies through a range of angles of the order of 40 degrees relative to the longitudinal axis of the aircraft. Slip stream effects prevents it from exceeding this range in power on flight. In comparison, a conventional airplane operates through an angle of attack range of the order of 20 degrees and because of downward effects from the main airfoil, the angle of the air relative to the longitudinal axis of the aircraft in the region of the horizontal tail surfaces varies approximately half this amount or through a range of 10 degrees.

With the conventional airplane it is hence possible to use a fixed stabilizer with a controllable trailing edge airfoil as an elevator. On the other hand, in the case of the low aspect ratio all-wing airplane illustrated, the full angle of attack range of the airplane cannot be identified with a conventional stablizer and a trailing edge elevator unless the stabilizer is made adjustable through a wide range of angles of the order of 30 degrees, this condition resulting from the wide range of angles of incidence of the ambient air in the region of the tail surfaces. The use of a stabilizer adjustable through such a range makes it possible to trim the airplane through its performing speed range but the controllability of the aircraft is still uncertain because of the necessity of properly adjusting the stabilizer in order to effect moderate or large changes in trim speed and the necessity of adjusting it during performance of maneuvers.

By using the unit tail surface area arranged to be rotatable through a wide range of angles of the order of 70 degrees and by controlling the rotation directly by the usual elevator control linkage, or the power operated range shown herein, it is made possible to trim the airplane through its entire speed range, power on or power off, and perform the most violent maneuvers through the use of this control alone. It is also desirable to use these same surfaces to provide lateral control of the airplane.

Principally then to achieve the wide control ranges necessary in an all-wing aircraft of this type it is desirable to pivot the control surface at approximately the 25 percent chord line. Such a control surface will have a trailing tendency with respect to the angle of attack of the aircraft that is opposite to that of a common control surface; i. e., in effect it has a negative trailing tendency which urges the surface to increase its deflection toward an overbalanced position. Under certain conditions the pilot forces required to restrain such overbalance become excessive or the power boost forces necessary to control such overbalance become structurally excessive.

This undesirable overbalanced tendency is eliminated in a control surface of this type without altering the desirable characteristics by use of leading or anti-boost tab; i. e., a tab that normally moves in the same direction as the control surface but assumes a greater angular deflection relative to the main wing than the control surface.

Thus as the control surface is deflected toward its maximum travel in either direction the leading tab will deflect at a greater rate in the same direction to balance the control surface in the unstable ranges. As a result, as the overbalanced tendency increases in the control surface the balancing forces of the leading tab also increase.

To this end the unitary tail surfaces 34 and 36 are connected by suitable operating connections with the pilot control column 48 located in the pilot's compartment 12 so that these surfaces are moved identically by fore and aft movements of the control column to provide longitudinal control of the airplane, the surfaces being moved differentially by lateral movement of the column to provide lateral control of the airplane, or in compromise of these two movements by oblique movements of the control column.

The control column comprises a hand grip 50, a stick 52, a socket assembly 54, a trunnion 56, a pair of depending forked arms 58, and a universal assembly 60 shown most clearly in Fig. 2. The trunnion 56 has its fore and aft pivotal axes 62 fixed at its extremities to fixed airplane structure (not shown) and has the socket assembly 54 pivotally mounted on its lateral trunnion arms 64. With this arrangement it will be evident that the control column is mounted for universal movement about the intersection of the axis including arm 64 and the fore and aft axis 62.

The forked arms 58 which are rigid with the socket arm 54 carry at their depending ends a U-shaped frame 66 which supports a generally horizontal rearwardly directed tongue 68 terminating in a ball 70 of the universal assembly 60. The ball 70 is located a sufficient distance below the intersection of the fore and aft axes 62 with the axis of the trunnion arms 64 to provide an adequate moment arm for moving the control linkage attached thereto in response to movements of the stick. The ball 70 is received in a suitable socket 75 at the forward end of a push-pull rod 72 connected at its aft end to a sector wheel 73 (Fig. 1) which, through suitable cable connections, controls the left-hand unit surface 36. A smiliar push-pull rod 74 having a yoke 76 at its forward end suitably pinned to the socket 75 of the rod 72 is pivotally connected at its aft end to a sector wheel 78 which controls the right-hand unit surface 34 through suitable cable connections. It will be noted that the sector wheels 73 and 78 are equally laterally spaced from the control column and that push-pull rods 72, 74 connecting therewith diverge outwardly and aft from the ball 70 on the low end of the control column. The sector wheels 73 and 78 are centrally pivoted at 80 and 82, respectively, and have the aft ends of the rods 72, 74 pivotally connected thereto at eccentric points 83, 84 on adjacent inboard portions of the peripheries thereof.

The unit control surfaces 34 and 36 and the mechanism by which they are operatively conneceted to sector wheels 73 and 78 are identical except for their left-hand and right-hand characteristics and accordingly a description of the right surface 34 and its control mechanism will be sufficient for understanding of the invention.

The sector wheel 78 drives a hollow sector wheel 86 by means of cables 87 and 88 which run over suitable pulleys 89, 90 and 91 and have their opposite ends connected to the ends of the sectors of wheels 78 and 86 in a well-known manner to effect simultaneous and equal rotation of these wheels. It will be understood that to obtain the operation described, the cables 87, 88 operatively connecting wheels 78 and 86 for surface 34 are crossed, while the similar cables between wheels 73 and wheel 86 for surface 36 are not crossed, as will appear from Fig. 1. The sector wheel 86 is rotatably mounted on a shaft 92 journalled in forwardly extending arms of a bracket 94 (Fig. 3) carried by fixed airplane structure adjacent the axis of pivotation on surface 34.

Rotation of sector 86 actuates a valve 100 to selectively direct hydraulic fluid under pressure to the lines 102 and 104 leading to either side of the pair of actuating struts 106 and 108 whose piston rod ends 110 and 112, respectively, are fixed to the aircraft structure. It should be noted here that struts 106 and 108 are interconnected and as such act as a unit. The valve 100 and a cooperating feel strut 114 of a conventional cylinder and piston type are located within the hollow wheel 86 and have their remote ends pivotally connected to the wheel 86 at 116 and 118, respectively. Their adjacent ends are connected to a pin 120 which connects the apex of the triangular plates 121 and 122 disposed on either side of the sector wheel 86. The triangular plates 121 and 122 are pivoted on shaft 92 at a point in the center of the base of each of these plates. The free corners of the plates 121 and 122 which are above the shaft 92 are pivotally connected by means of rods 123 and 124 with the upper arms of horn 126 fixed to a torque tube 128 which is rotatable about the axis of pivotation of surface 34 and has this surface rigidly affixed thereto by a mounting bracket 130. The lower free corner of plates 121 and 122 are similarly connected to the lower arms of horn 126 by rods 132 (only one of which is shown). A pair of brackets 136 are disposed on either side of the sector wheel 86, one bracket being fastened to the plate 121 and the other to the plate 122. Each bracket also has a pivotal connection with the shaft 92. Each of the brackets 136 has a bifurcated upper end for receiving an adapter 138 which is pivotally connected thereto and carries the relatively free end of each of the actuating struts 106 and 108. It is then apparent that when the struts 106 and 108 are controllably actuated by means of the valve 100 they impart movement to the brackets 136 and the plates 121, 122 fastened thereto. In turn the plates 121, 122 through the connecting rods 123, 124 and 132 will pivot the horn 126 and rotate the torque tube 128 so as to move the control surface 34 which is rigidly connected thereto. The operation of the valve 100 and the feel strut 114 will be more fully described in connection with Figs. 5 and 6.

Upon movement of the control surface 34 a leading tab mechanism is simultaneously placed in operation. Under these conditions the motion of the cable sector 86 is imparted by the boost mechanism to the horn 126 as above described which in turn imparts rotational movement to a bell crank supporting member 140 which is coaxially disposed with respect to the horn and is fixed thereto inboard of the torque tube 128 so as to rotate in unison and therewith (better seen in Fig. 4). A bell crank 142 has one corner pivoted to the support 140 at 144 and has another corner thereof pivotally connected at 146 to control rod 148 which extends axially through the torque tube 128 and is pivotally connected at its outboard end to a bell crank 150 (Fig. 1) which has its other free arm connected by a link 152 to one of the horns 154 of tab 40. Another horn 156 is connected by a parallel link 158 to a bell crank 160 which is operated by an extension 162 of rod 148. The third corner of bell crank 142 (Fig. 4) is pivotally attached at 166 to one end of rod 168, the other end of which is pivotally attached at 170 to a lever 172. The lever 172 is centrally pivoted at a point 174 on another lever 176 the upper end of which is pivoted to fixed structure of the airplane at 178 and the lower end of which is adjustably fixed by means of link 180 to the trim tab adjusting mechanism 182. A connector 184 serves to pivotally fix the lower end of lever 172 to aircraft structure adjacent the trim tab adjusting mechanism 182.

Thus it is evident that when the trim tab adjusting mechanism is not being operated the lever 176 which carries the pivot point 174 for lever 172 is considered fixed and the operation of the tab 40 as a leading tab is a function of the geometry of the tab operating linkage. It is readily apparent that rotation of horn 126 to move the surface 34 also results in similar rotation of tab operating rod 148 and bell crank support 140 and that the bell crank 142 carried by the latter is rotated bodily therewith. The fixed point 174 is, however, spaced from the axis of rotation of these parts and as a result the bodily rotation of the bell crank 142 about this axis causes the bell crank to rock about its pivotal support 144 and impart a reciprocating movement to rod 148. Thus, referring to Figs. 3 and 4, if the sector wheel 86 is moved in a counterclockwise direction as indicated by the arrows, the valve 100 will be actuated so as to direct fluid to the actuating struts 106, 108 which impart motion in the same direction to the upper ends of plates 121, 122 and also impart counterclockwise motion to the horn 126 by means of the connections therewith through rods 123, 124 and 132. Counterclockwise motion of the horn 126 and its integral torque tube 128 will cause the trailing portion of the control surface 34 to be moved upwardly. At the same time the bell crank support 140 will rotate bell crank 142 which in turn will simultaneously pivot about 144 and move the control rod 148 inboard. The outboard end of control rod 148 being connected to one free end of the bell cranks 150 and 160 will draw the links 152 and 158 forward so that the tab 40 will also be moved upwardly. The geometry of the tab mechanism is such that the trim tab 40 will be displaced in the same direction as the control surface 34 but at a greater angular rate than the surface 34 in relation to the main wing.

Figure 5:
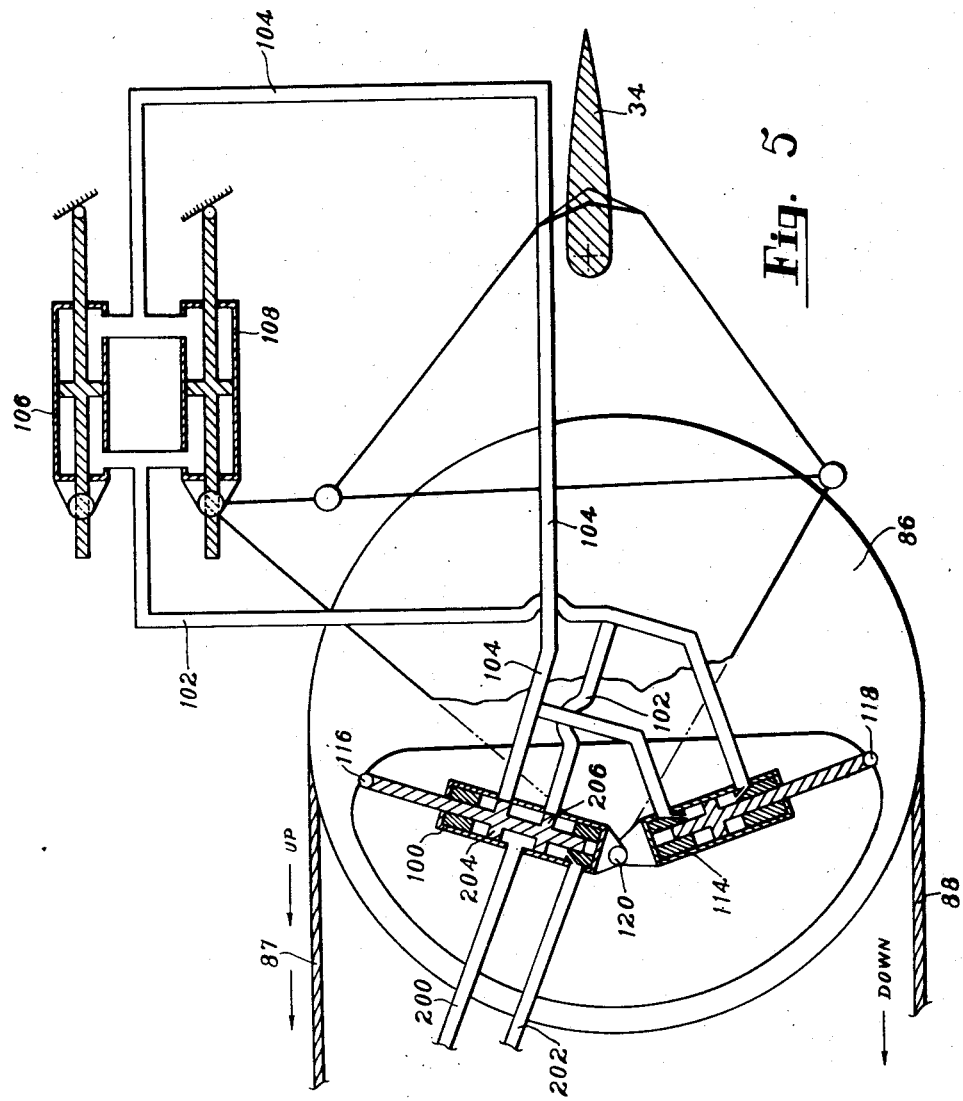
Fig. 5 is a schematic diagram of the hydraulic power boost system indicating the position of the elements and the control surface when the system is in neutral.

The operation of the valve 100, the feel strut 114, and the actuating struts 106, 108 is better understood by referring to the schematic diagram in Fig. 5. Hydraulic fluid under pressure can be admitted to the valve 100 through the line 200 while the line 202 provides a return line from the mechanism. In this position of the valve 100 it will be noted that the lands 204 and 206 within the valve 100 cover the ports leading to the lines 102 and 104 so that the pistons in the struts 106, 108 will be locked in position. In this neutral position of the valve 100 no motion is imparted to the surface 34. The feel strut 114 is proportionately smaller than the actuating struts 106, 108 and has each of its ends in fluid communication with one of the lines 102, 104. Thus when fluid under pressure is being directed to either side of the actuating struts 106, 108, a certain amount of fluid will enter either side of the feel strut 114 thereby introducing forces within the boost mechanism which tend to resist any motion of the sector wheel 86 and provide a certain amount of feel to the pilot's control member 48. Since the feel strut 114 is smaller than the actuating struts 106, 108 only a small resisting force will be applied at the connection 118 on the sector wheel 86.

Thus when it is intended to move the surface 34 upwardly the pilot moves the control stick 48 so that the control cable 87 is moved in the direction of the arrow shown in Fig. 6. Movement of the control cable 87 will rotate the sector wheel 86 counterclockwise so that the control rod 210 of the valve 100 will move the lands 204 and 206 to the position wherein the ports leading to lines 102 and 104 are open. Fluid under pressure will then be admitted to the line 102 from line 200 tending to move the strut 108 and the strut 106 (not shown in this figure) to the left as indicated by the arrow so that through the pivoted connections the control surface 34 will be moved from the dotted to the full line position. At the same time fluid under pressure will also pass via the line 212 into the lower end of strut 114 tending to move the strut in opposition to the motion imparted originally to the sector wheel 86 thereby creating a proportionate resisting force or feel in the control system. Additionally, as the surface reaches the desired position and the sector wheel motion ends (as a result of the release of pressure by the pilot), the feel strut 114 acts as a follow-up tending to move the pivot connection 120 toward a position of neutrality wherein the control valve 100 will again assume the position shown in Fig. 5 to hold the surface in locked position. Thus to return the control surface to its neutral position it is necessary to reverse the motion of the sector wheel 86 to reverse the direction of flow of fluid in the system. Under these conditions the feel force in the system is similarly created as described above and the follow-up valve neutralizing action commences upon release of pressure on the controls by the pilot.

It will be noted that the control rod 210 in the valve 100 has a drilled passage 216 which via the ports 218 and 220 permits fluid communication between the outboard sides of the lands 204, 206 so that the lines 102 and 104 can function either as pressure or return lines.

As a result of this invention a control system has been provided in which both longitudinal and lateral control is obtained by actuation of a single pilot operated control member and wherein both a power boost and leading tab mechanism is provided. It is further evident that as a result of this invention a power boost mechanism has been provided in combination with the foregoing wherein a control surface having overbalanced tendencies is properly balanced in its unstable ranges by a leading or anti-boost mechanism which is synchronized to take effect in proportion to the relative displacement of the control surface.

Further as a result of this invention a power boost mechanism has been provided for moving unit control surfaces of the type described wherein proportionate feel forces are provided in the system by a feel strut which also operates as a valve neutralizer to hold the surface in any deflected position.

While only one embodiment of the invention has been shown and disclosed herein, it will be understood that numerous changes in the construction and operation of the parts may be made without departing from the scope of this novel concept.

I claim,

1. In an airplane, a main lifting surface, two control surfaces mounted on opposite sides of the fore and aft center line of said main surface, a pilot operated control member having two different movements, a hydraulic power boost strut connected to each of said control surfaces for moving the latter identically in response to one of said movements of said control member and in opposite directions in response to the other of said movements, said power boost struts operating said surfaces simultaneously in response to either movement of said control member, and control mechanism interposed between said control member and each of said power boost struts including a sector wheel operatively connected to said control member, a feel cylinder having one of its ends attached to said sector wheel, a selector valve attached to said sector wheel and operated by movement of the same for directing pressure fluid from a reservoir to either end of its associated power boost strut and for simultaneously directing pressure fluid of a lesser amount to said feel cylinder from said reservoir for producing forces resisting movement of said control member proportionate to but less than the forces produced by said associated power boost strut, an operative connection between said associated power boost strut and said valve for returning the latter to its non-selective positions whereby the control surface associated with said associated power boost strut is hydraulically locked in the position of deflection corresponding to the degree of movement of said control member, and an operative connection between said feel cylinder and said associated power boost strut and said valve whereby said resisting forces are made inoperative when said valve is returned to its non-selective position.

2. In an all-wing tailless type airplane, a major lifting surface, two aerodynamically unstable control surfaces laterally disposed from the fore and aft center line of said lifting surface, a single pilot operated member for moving said surfaces identically and in opposite directions with respect to said lifting surface to effect longitudinal and lateral control respectively, a hydraulic power boost strut connected to each of said surfaces, mechanism between said member and each of said power boost struts including a sector wheel adapted to be rotated by said member, a feel strut attached to said sector wheel, a selector valve governed by the rotation of said sector wheel for selectively directing pressure fluid from a reservoir to its associated power boost strut for activating the same and for directing pressure fluid but of a lesser amount than that directed to said associated power boost strut to said feel strut for producing forces resisting movement of said sector wheel and said pilot operated member proportionate to but less than the forces produced by said associated power boost strut, follow-up means governed by said associated power boost strut for returning said selector valve to a neutral position while said sector wheel is maintained in a rotated position, and a linkage connection between said follow-up means and said feel strut for neutralizing said resisting forces when said selector valve is returned to its neutral position, and leading tabs responsive to movement of said surfaces for establishing conventional forces on said surfaces in unstable attitudes.

CARL SCHULTZ.

REFERENCES CITED

The following references are of record in the file of this patent:

UNITED STATES PATENTS

| Number | Name | Date |
| --- | --- | --- |
| 2,140,037 | Swisher | Dec. 13, 1938 |
| 2,222,886 | Voigt | Nov. 26, 1940 |
| 2,366,382 | Burton et al. | Jan. 2, 1945 |
| 2,406,588 | Cornelius | Aug. 27, 1946 |
| 2,416,958 | Sears | Mar. 4, 1947 |
| 2,430,808 | Eaton | Nov. 11, 1947 |

FOREIGN PATENTS

| Number | Country | Date |
| --- | --- | --- |
| 670,085 | France | Aug. 12, 1929 |